G. C. SCHMIDT.
FILTER FOR OIL AND OTHER LUBRICANTS.
APPLICATION FILED OCT. 14, 1919.
1,360,149.
Patented Nov. 23, 1920.
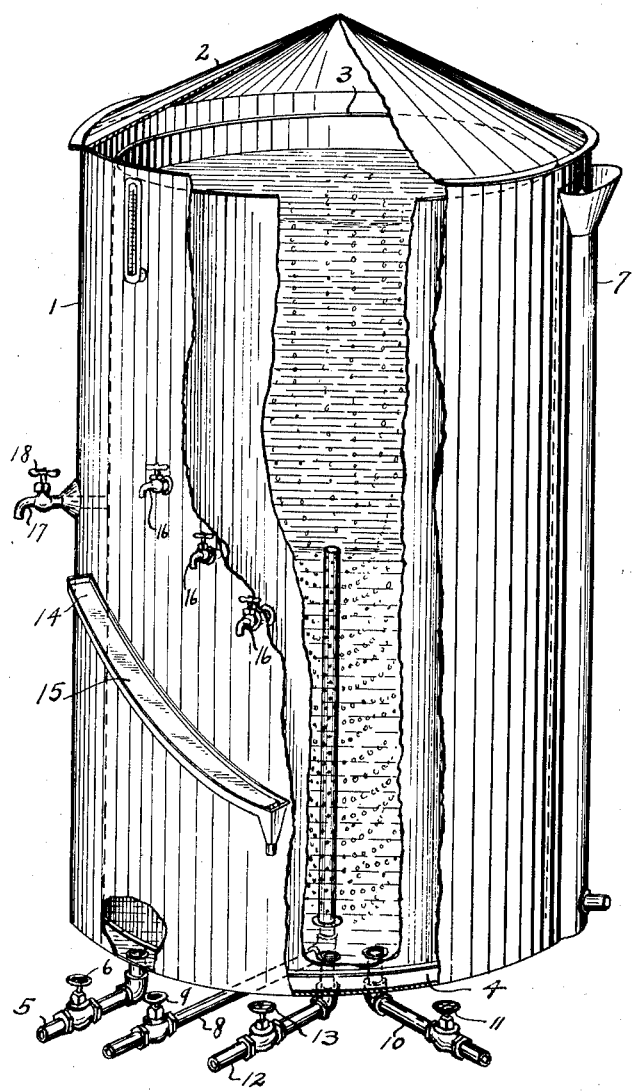
INVENTOR
George C. Schmidt
BY
Hardway Cathy
ATTORNEYS.

UNITED STATES PATENT OFFICE.

GEORGE C. SCHMIDT, OF HOUSTON, TEXAS.

FILTER FOR OIL AND OTHER LUBRICANTS.

1,360,149.  Specification of Letters Patent.  Patented Nov. 23, 1920.

Application filed October 14, 1919. Serial No. 330,659.

*To all whom it may concern:*

Be it known that I, GEORGE C. SCHMIDT, a citizen of the United States, residing at Houston, in the county of Harris and State of Texas, have invented certain new and useful Improvements in Filters for Oil and Other Lubricants, of which the following is a specification.

This invention relates to new and useful improvements in a filter for oil and other lubricants. One object of the invention is to provide, a device of the character described, which is specially designed for the purpose of cleansing oils, particularly waste oils. Lubricating oils used in machinery such as internal combustion engines and the like soon become filled with carbon, particles of metal and other foreign matter to such an extent that it is of little or no value as a lubricant and must be removed from the machinery and a new oil supplied instead. This waste oil is usually discarded as worthless but, as a matter of fact, it contains a high percentage of lubricant and it is only necessary to cleanse the same of foreign matter in order to render it a high grade lubricating oil. The filter herein described has been designed for the purpose of treating this waste oil and cleansing all foreign matter therefrom.

Another object of the invention is to provide a filter of the character described which is of simple construction and may be cheaply and easily manufactured.

With the above and other objects in view the invention has particular relation to certain novel features of construction, operation and arrangement of parts, an example of which is given in this specification and illustrated in the accompanying drawing, wherein:—

The figure shows a side elevation of the filter partially broken away for the sake of illustration.

Referring to the drawing the numeral 1, refers to a cylindrical metallic tank, having the removable covering 2 and within this tank there is a cylindrical oil receptacle 3, having a common bottom with said tank and spaced from the walls thereof, providing a water chamber 4 through which heated water may circulate around the receptacle 3 to heat the contents thereof. Water is admitted to the bottom of this chamber through the inlet pipe 5, which is controlled by the valve 6 and when said chamber is filled, the overflow will be drained off through the down spout 7 carried by the wall of the tank 1. The heated water is circulated around the oil receptacle 3, which is filled either wholly or partially with the oil to be cleansed. This receptacle may be filled with the waste oil by removing covering 2 of the tank.

When the waste oil is placed in the receptacle 3, there is mixed therewith soda ash in the proportion of about one pound of soda ash to 10 gallons of oil. The soda ash, however, is dissolved in water previous to the mixing. This soda ash is composed of one part, sodium carbonate and one part sodium chlorid. The sodium carbonate is a good cleanser and the sodium chlorid neutralizes the carbonate and prevents it from injuring the oil. However, Golddust or other washing compound may be used instead of the soda ash.

The numeral 8 refers to a steam or air line which is controlled by the valve 9 and which enters the receptacle 3 at the bottom and whose inner end extends upwardly within said receptacle and is perforated. Hot air or hot steam is forced through said line 8 and out through said perforations into the oil, further heating the same and causing a violent ebullition thereof, thoroughly mixing the same with the washing compound used and causing the water and other foreign matter in the oil to become separated from the oil and to gradually settle to the bottom of the receptacle. For the purpose of permitting this settling to take place more rapidly the valve 9 may be closed at the proper time and the pure oil will collect at the top and the water and foreign matter at the bottom and this latter may then be drawn off through the outlet pipe 10 which leads from the bottom of the receptacle 3 and is controlled by the valve 11.

The numeral 12 refers to an inlet water pipe which enters the bottom of the receptacle 3 and which is controlled by the valve 13. Through this pipe pure water may be admitted to the receptacle to raise the oil, which floats thereon, to the desired height in the receptacle.

Fastened to one side of the tank on the outside, there is a test trough 14, which inclines and whose upper face 15 has a reflecting surface, preferably being nickel plated and spaced at a uniform distance above this trough and the test cocks 16, 16, 16, which lead out from the receptacle. When it is desired to test the lubricant at different points, the corresponding cock 16 may be opened and the lubricant will be permitted to drip on the trough 14 in small quantities and the drippings will spread out over the reflecting surface 13, and from an inspection of these samples it can be readily determined whether or not they contain any foreign matter or are entirely cleansed.

When the oil is thoroughly cleansed it may be drawn off through the discharge spout 17, which is controlled by the valve 18 and in order to draw off all of the lubricant contained in the receptacle water may be gradually admitted through the pipe 12 to gradually elevate the lubricant as it is being drawn off so that all of the lubricant in the receptacle may be brought within the range of the spout 17, and discharged therethrough.

What I claim is:

1. A device of the character described, including a tank, an oil receptacle arranged within said tank and spaced from the walls thereof, to form a heating chamber between them, a means for circulating a heating fluid through said chamber, a test trough secured to the wall of the tank and a test cock leading from said receptacle through which samples of the contents thereof may be discharged into said trough.

2. A device of the character described, including a tank, a lubricant receptacle arranged concentrically within the tank and spaced from the walls thereof, forming a chamber around said receptacle, a means for circulating a heating fluid through said chamber, means for introducing a heating fluid within the contents of said receptacle, an inclined trough arranged on the outer side of said tank, whose upper face is formed into a reflecting surface and a plurality of test cocks communicating with said receptacle and arranged above said trough and through which samples of the contents of said receptacle may be discharged into said trough.

In testimony whereof I have signed my name to this specification in the presence of two subscribing witnesses.

GEORGE C. SCHMIDT.

Witnesses:
   J. T. HARDWAY.
   M. A. CATHEY.